United States Patent [19]

Hartstein et al.

[11] 4,229,732
[45] Oct. 21, 1980

[54] MICROMECHANICAL DISPLAY LOGIC AND ARRAY

[75] Inventors: Allan M. Hartstein, Chappaqua, N.Y.; Kurt E. Petersen, San Jose, Calif.

[73] Assignee: International Business Machines Corporation, Armonk, N.Y.

[21] Appl. No.: 968,054

[22] Filed: Dec. 11, 1978

[51] Int. Cl.³ .............................................. G08B 5/24
[52] U.S. Cl. .................................... 340/378.2; 340/373; 340/719; 340/764; 340/381; 29/592 R; 358/233
[58] Field of Search ............ 340/719, 764, 373, 378.2; 358/230, 233; 29/592; 315/373

[56] References Cited

U.S. PATENT DOCUMENTS

| | | | |
|---|---|---|---|
| 3,600,798 | 8/1971 | Lee | 29/592 |
| 3,862,360 | 1/1975 | Dill | 340/719 |
| 3,886,310 | 5/1975 | Goldberg | 315/373 X |
| 3,896,338 | 7/1975 | Nathanson | 315/373 |
| 4,006,383 | 2/1977 | Luo | 340/718 |
| 4,087,810 | 5/1978 | Hung | 340/719 |
| 4,113,360 | 9/1978 | Baur | 340/764 |

OTHER PUBLICATIONS

Thomas et al., IEEE Trans. Electr. Dev. ED-22 765, (1975).
Petersen, "Micromechanical Light Deflector Array," IBM Technical Disclosure Bulletin, 20, No. 1, 355 (Jun. 1977).
Petersen, "Micromechanical . . . Silicon," Appl. Phys. Lett. 31, 521-523 (1977).

Primary Examiner—Harold I. Pitts
Attorney, Agent, or Firm—Graham S. Jones, II

[57] ABSTRACT

A display device, addressing circuitry, and semiconductor control logic are all portions of an integrated structure formed by thin film technology on a single silicon wafer. The display comprises a thin film micromechanical electrostatic form of light reflective display formed by depositing thin films upon a silicon wafer and selectively etching to form metal-amorphous oxide micromechanical leaves deflected by applying potential thereto to provide electrostatic deflection. MOSFET devices are also formed upon the silicon wafer in juxtaposition with a plurality of micromechanical display elements. Addressing circuitry is connected to the MOSFET devices.

8 Claims, 9 Drawing Figures

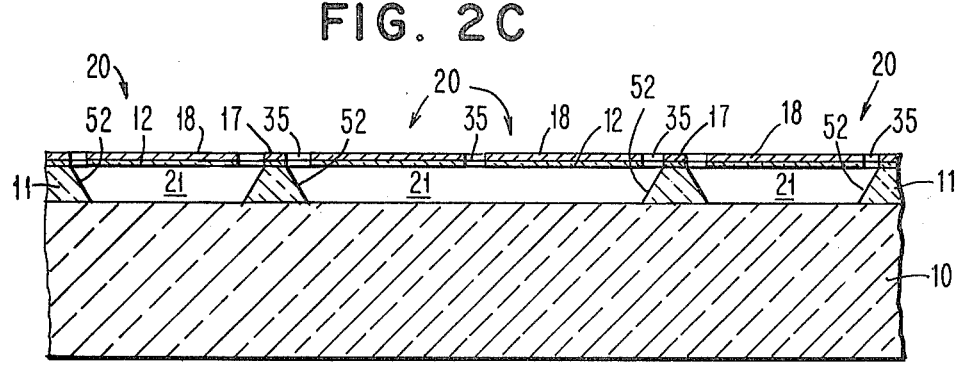
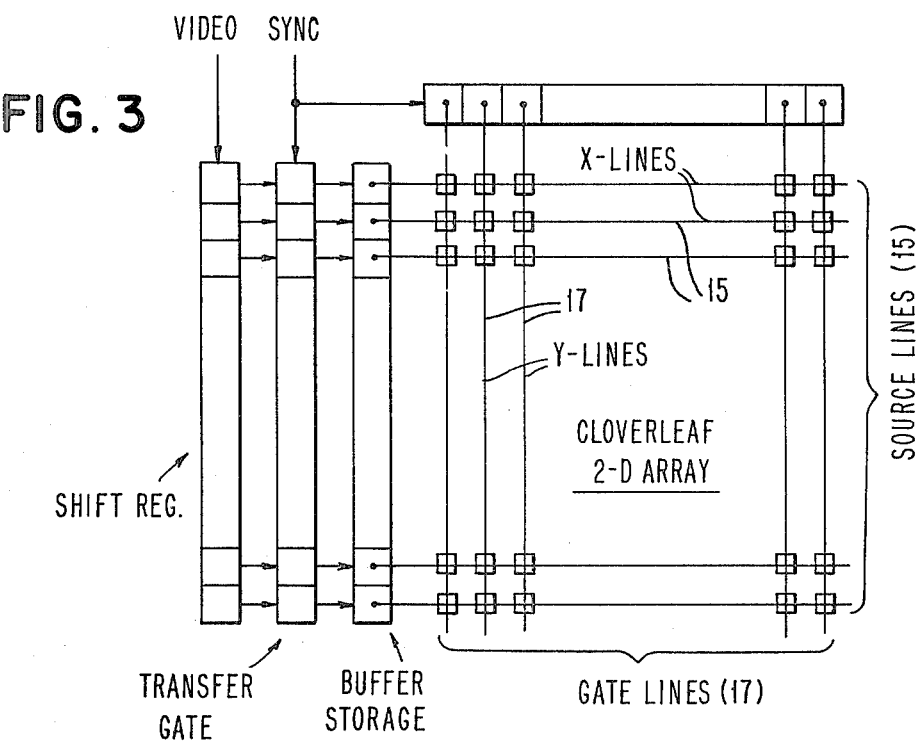

MICROMECHANICAL DISPLAY LOGIC AND ARRAY

DESCRIPTION

1. Technical Field

This invention relates to pictorial communication by means of a display element for a television type of receiver circuitry and more particularly to a display device in the form of a deformable medium picture reproducer employing deflectable light valves.

2. Background Art

It has been demonstrated by Thomas et al, IEEE Trans. Electr. Dev. ED-22, 765 (1975) that high resolution projection-type, Schlieren optical imaging systems can be realized with a cloverleaf "deformographic"-type structure. Individual cloverleaves can be selectively deflected toward the substrate by depositing electrons from an electron gun onto the thin metal layer covering the thin oxide membranes. Since the metal grid on the substrate surrounding the structures is biased positively, as shown, each membrane which has been electrostatically charged by the electron beam is bent downwardly by the electrostatic forces and remains bent until the charge is removed. The Thomas et al design has several characteristics: (1) because the electrostatic attraction occurs only at the edges of the leaves, high deflection voltages (150-200 V) are required; (2) as in an ordinary cathode-ray tube, an electron beam is the primary addressing mechanism with all the associated high voltage supplies, filament heater, etc,; (3) the electron beam may actually damage the $SiO_2$ membranes and shorten their operating life—a similar problem is encountered in electron beam addressed, solid-state charge storage memories. The primary advantage of the Thomas et al display device is the inherent memory.

A metal coated oxide deflectable member has been described in Petersen, "Micromechanical Light Deflector Array," IBM Technical Disclosure Bulletin, 20, No. 1, 355 (June 1977). The device includes numerous micromechanical deflectable strips, all of which are fabricated upon a silicon wafer. Each device has a lead for connection to an external control system. Inclusion of control circuitry and semiconductor control devices in an integrated structure is not contemplated there. See also Petersen, "Micromechanical Light Modulator Array Fabricated on Silicon," Appl. Phys. Lett. 31, 521-523 (1977).

BRIEF DESCRIPTION OF THE DRAWINGS

FIG. 2C is a sectional view taken along line 2C—2C in FIG. 2A.

FIG. 3 is an electrical schematic of a display control system for a display array in accordance with this invention.

DISCLOSURE OF THE INVENTION

Figure 1A:
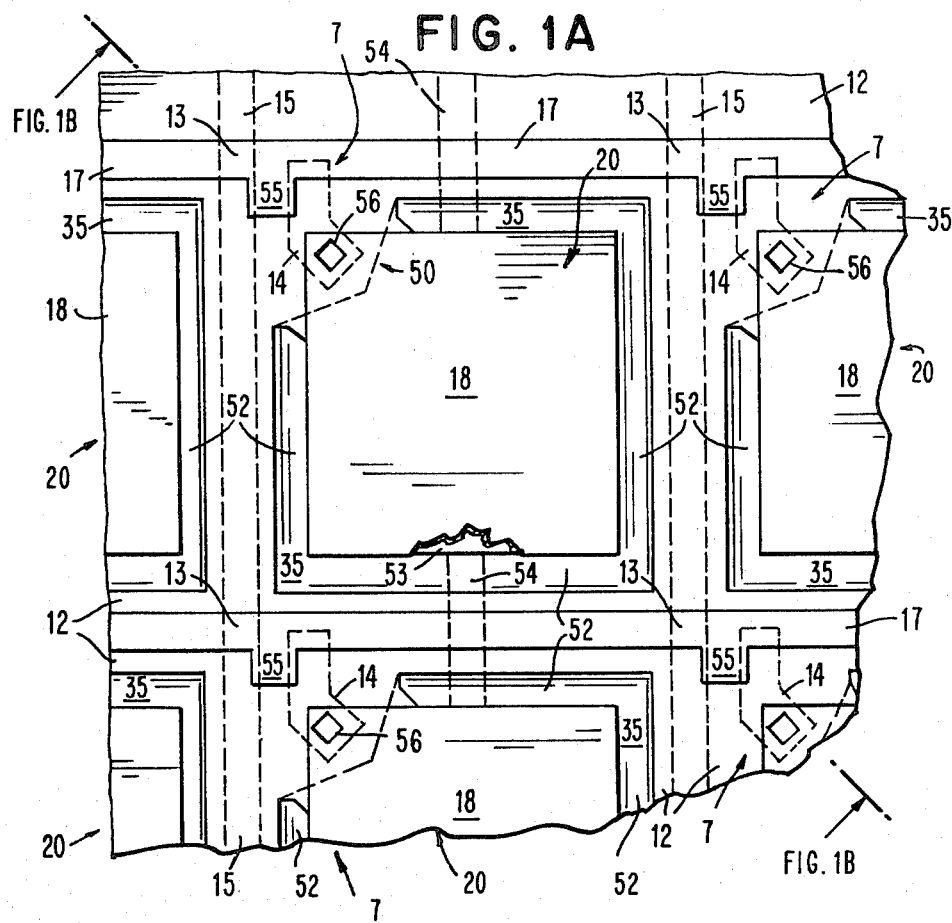
FIG. 1A shows a plan view of an optical imaging display device incorporating distributed MOSFET logic and micromechanical display elements.
Figure 1B:
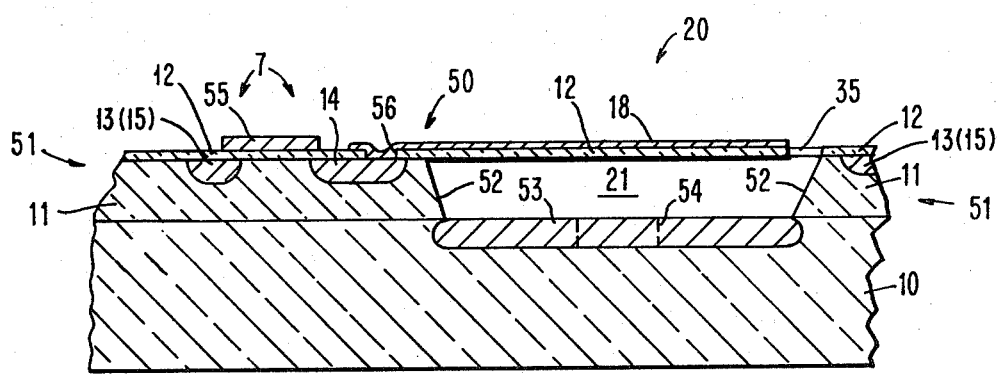
FIG. 1B is a sectional view along line 1B—1B in FIG. 1A.

FIGS. 1A and 1B show views of a micromechanical display with integrated FET circuits and addressing circuitry. A micromechanically deflectable, square reflector element or leaf 20 composed of a silicon dioxide layer 12 and a thinner metallization layer 18 is shown secured at its upper lefthand corner 50 to a plateau 51 (FIG. 1B) composed of an epitaxial silicon layer 11 and silicon dioxide layer 12 deposited upon it. The epitaxial layer 11 rests upon a substrate which is a silicon wafer 10. Beneath leaf 20 a hollow well hole 21 is formed in the epitaxial layer 11. Walls 52 of hole 21 are sloped inwardly towards the lower surface of the hole 21, which is formed by a thin (etch stopping) buried p+ layer 53 of silicon which was diffused into the original wafer 10 in the appropriate position for each hole 21 before the layer 11 was deposited, and long before the hole 21 was formed. Hole 21 is formed only after layers 12 and 18 are deposited to form leaf 20. Then, the holes 21 are etched through slots 35 on the edges of each leaf 20 by means of etchants described below in connection with FIGS. 2A-2C. Layer 53 is not etchable by the etchants used, so it forms a flat lower surface for hole 21. Layer 53 also forms a lower electrode of the micromechanical, electrostatic display element with leaf 20. Layer 53 is connected to ground by thin films of p+ conductors 54 (FIG. 1A) on the same level as layer 53. A MOSFET device 7 is formed by source 13, which is a portion of a diffusion line 15 in the epitaxial layer 11. Line 15 serves as the X-address line of a "half-select" system in an X-Y address circuit for turning on one of the various FET devices 7. The gate 55 comprises a projection of metallization from line 17 above silicon dioxide layer 12. Metallic line 17 also serves as the y-address line of the x-y address circuit. The drain 14 of the FET is located diagonally to the lower right (FIG. 1A) of the gate projection 55 of line 17 forming the FET gate which bridges the source 13 and drain 14. The drain 14 is connected through opening 56 to the metal film 18 of leaf 20 so that when gate 55 (line 17) is negative and source 13 (line 15) is negative, current will flow onto metal 18 of leaf 20 causing it to deflect to present an image which is stored until the charge leaks away. The potential upon layer 53 is maintained by conductor strips 54 deposited along with layer 53, connected to an external potential source or ground.

Figure 2A:
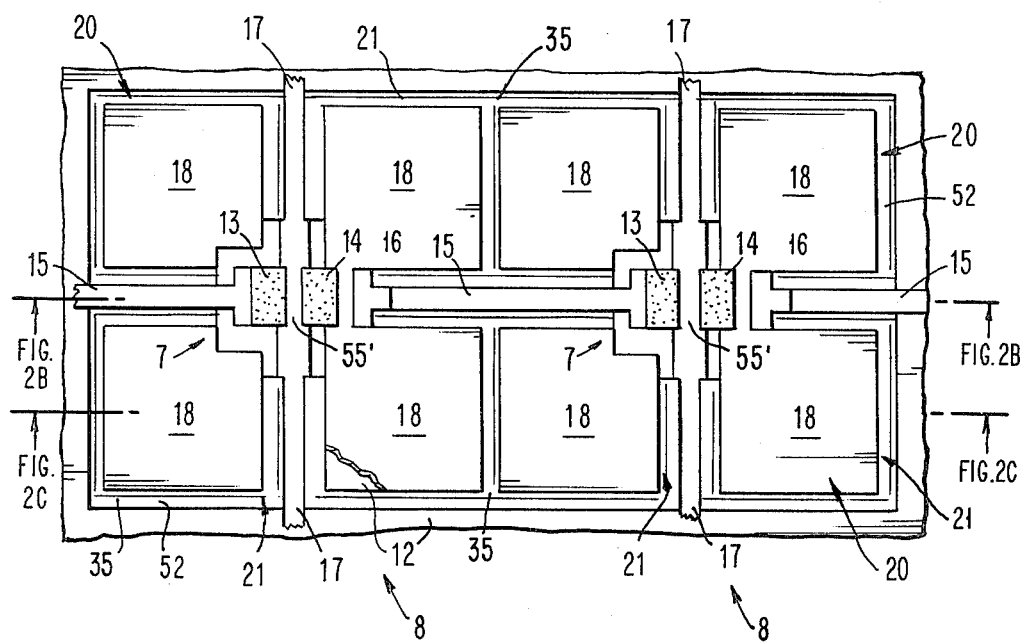
FIG. 2A is a plan view of a similar display device to FIG. 1A with a cloverleaf pattern of display elements.
Figure 2B:
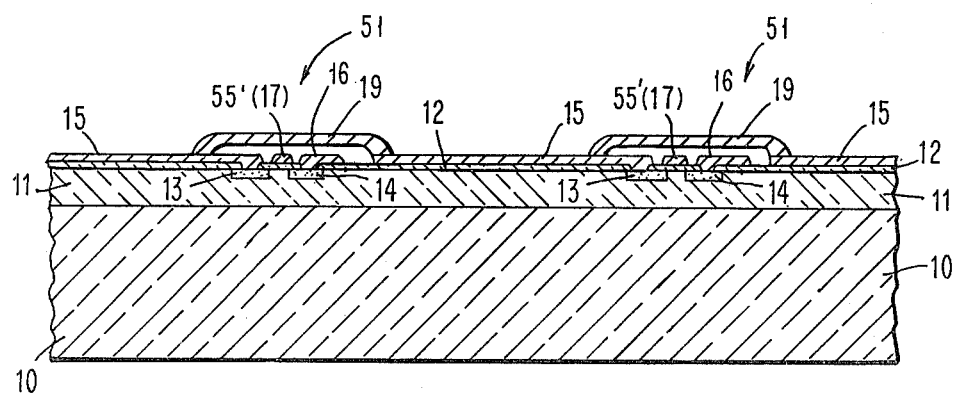
FIG. 2B is a sectional view taken along line 2B—2B in FIG. 2A.

Recent techniques developed to free similar oxide membranes from a silicon surface using anisotropic etching methods make it possible to construct the devices shown in FIGS. 2A, 2B and 2C. First, a p-type epitaxial silicon layer 11 is grown on a p+ ($\geq 5 \times 10^{19} cm^{-3}$ Boron) wafer 10 and an oxide layer 12 is grown over layer 11. Source 13 and drain 14 diffusions (n-type) rest on layer 11, for example, on about 2 mil centers. Lines 15 contact the sources 13, lines 16 (not shown in FIG. 2A) contact the drains 14, and lines 17 contact the gate Y-electrodes 55' for each column and the leaf metallization 18 is deposited and defined as shown in FIGS. 2A and 2C. A first crossover layer of metallization 19 shown in FIG. 2B completes the connection of all the sources 13 in a row to a single X-electrode (not shown) and other crossovers (not shown) electrically connect the four leaves 20 of each cloverleaf pattern 8 to the corresponding drain electrode 14 via line 16. Finally, the oxide layer 12 is etched away around the pattern of leaves 20 to form slots 35 as shown, and some of the silicon of wafer 10 is etched away under the leaves 20 to form holes 21 as described below.

Process of Formation of Device

Since the etchant used on the silicon (ethylenediamine, water and pyrocatechol) does not attack p+ material, the leaves 20 are easily undercut while the etched depth is defined by the thickness of the epitaxial layer 11. By controlling the etching time, a plateau 51 of epitaxial silicon 11 remains which contains the MOS transistor 7 and supports the metal-coated oxide leaves 20.

A layer of $SiO_2$ 12 is thermally grown (to a thickness t of about 3000–5000 Å) on a layer 11 which is crystallographically oriented such that the top surface of the wafer is the (100) plane.

The electrode patterns 15, 16 and 17 as shown in FIGS. 1 and 2 are defined on top of the oxide (parallel to the crystalline <110> directions which consists of a very thin metal film ($\sim 500$ Å $<<$ t), for example, aluminum. Next, the leaf pattern is etched in the oxide (FIGS. 2A and 2C) and the bare silicon is exposed. Finally, the wafer 10 is etched in a solution of pyrocatechol, water and ethylenediamine which preferentially etches the silicon along all crystallographic planes except the (111). This results in a shallow, rectangular well of a depth about equal to the thickness of epitaxial layer 11 etched into the silicon and underneath the metal-coated oxide membranes, as shown in FIG. 2C. The metal-coated oxide leaf membranes 20 are now free-standing and supported only at one corner.

By orienting the wafer so that the edges of leaves 20 point in the <110> directions, undercutting of the oxide will occur almost exclusively under the leaves 20 and not around the periphery of the structure. The result is an approximately rectangular well hole 21 in the silicon above which the leaves 20 extend. Since the etchant does not attack highly p-type regions in the silicon 10, the depth of the well holes 21 is controlled by growing a lightly doped epitaxial layer 11 on a highly doped p-type wafer. The depth of well hole 21 will then correspond to the thickness of the epitaxial layer 11, typically 10 μm.

Large arrays of these cloverleaf patterns 8 might be constructed and used in an image projection system like that demonstrated by Thomas et al. To operate the device, individual elements would be turned on by raising the appropriate X- and Y-lines 15 and 17 high which would turn on the gate 55′ of the MOS transistor 7 (with the Y-line) and charge up the cloverleaf metallization 18 (through the X-line). When the drain electrode 16 is fully charged, the leaves 20 will be electrostatically attracted toward the grounded substrate and will be deflected downwardly. By applying a voltage V between the silicon wafer 10 and the metal 18 on any one of the leaves 20, a downward deflection of the leaf 20 will occur due to the electrostatic attraction between the wafer 10 and the metal 18 on the leaf 20.

Since the driving voltages for the membranes are within the range of integrated circuit voltage levels, driving and decoding circuitry can be fabricated on the same silicon chip 10, greatly reducing the number and complexity of external connections to the array. Furthermore, when the potential of a gate electrode 17 is lowered, the charge which was transferred to the metal layer 18 of the cloverleaf patterns via the drain electrode 16 will be stored there exactly like the well known one-transistor memory cell; and the leaves 20 will continue to be bend downwardly (and the image will be stored) until the cell is re-addressed or the charge leaks off. Since charge leakage times can be on the order of many milliseconds, refresh rates on the order of 50 cycles per second might be possible. However, in conventional television-type displays, the image is rewritten on the order of 50 cycles per second, so it would, in fact, be necessary for the single transistor memory cell to store one frame for about only 20 milliseconds.

A two-dimensional array would be addressed by raising one gate electrode 17, Y-line, to a high potential and addressing all the X-lines 15 either high or low simultaneously, then the next Y-line 17 would rise and the X-lines 15 addressed again simultaneously with the next line of information. A schematic of the circuit organization for a television projection system is shown in FIG. 3.

Since this image projection device is made entirely on silicon, the addressing and decoding circuitry would also be on the same chip. Standard Schlieren image projection systems (commonly used for such deformographic light valves) would be used to view the pattern written on the array. Note that the image written onto the array, as shown in FIG. 3, is actually rotated by 90° (with respect to standard television conventions) as it is drawn.

Alternative Embodiment

This embodiment pertains to organization for an all solid state light valve array with self-contained memory for video projection systems. The techniques needed for fabrication are standard silicon processing techniques including oxidation, photolithography, selective etching (differential etch), diffusions, etc.

Device Organization

Figure 4:
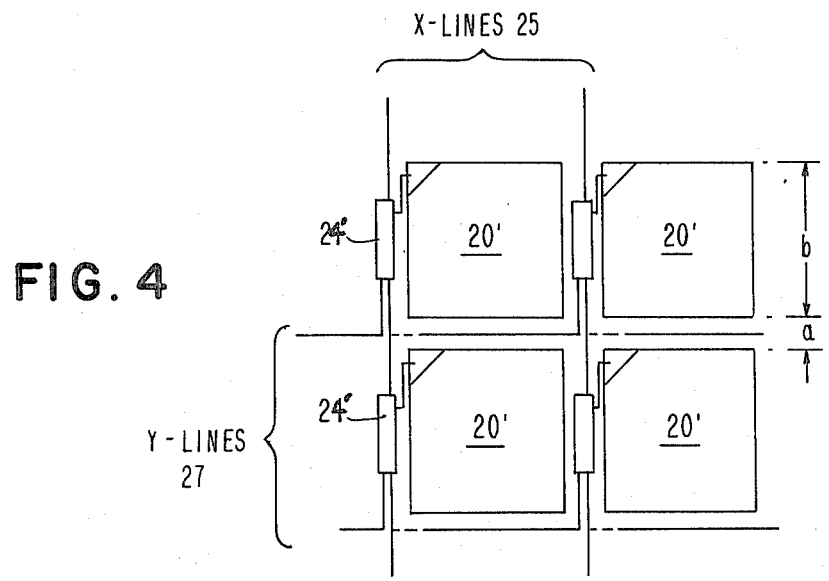
FIG. 4 shows an alternative micromechanical display system to that in FIGS. 1A and 1B and 2A, 2B and 2C.

The general organization of such a system is illustrated in FIG. 4 where four cells out of an array are depicted. The large square area 20′ is the micromechanical mirror leaf element for reflecting the light. The rectangular segments 21 are reserved for either dynamic or static memory for each cell. Addressing is accomplished by X and Y lines 25, 27 respectively as in standard memory technology utilizing diffusions to accomplish the cross under points. The dimensions a and b chosen will depend on the array size and technology implemented but typical values might be (a) 5–25 μm and (b) 50–200 μm. For projection purposes it is best to keep a as small as possible and make b a large as possible compatible with the overall chip size. The above numbers are for arrays in the 100×100 to 400×400 element size, typical of the resolution of TV screens. The ultimate size of an array is limited only by chip size and device yield.

Device Structure

Next we will consider the fabrication of a single cell utilizing MOSFET processing for the memory element. The actual memory circuit chosen is not important and for illustrative purposes I will only show fabrication of a single FET element. Any number of circuits are possible with standard interconnection techniques.

Figure 5A:
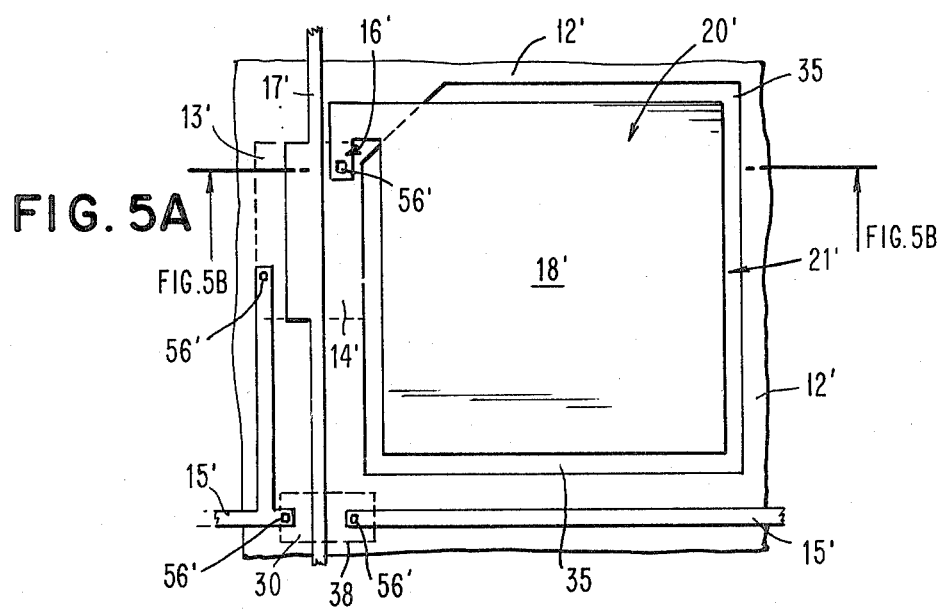
FIG. 5A shows an enlarged top view of an element from FIG. 4.
Figure 5B:
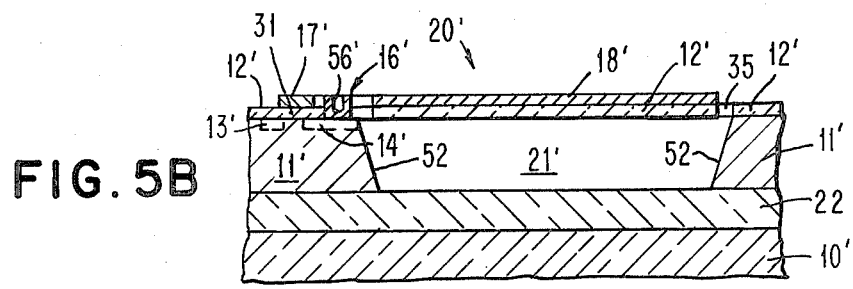
FIG. 5B shows a section taken along lines 5B—5B to FIG. 5A.

The detailed structure of one possible cell is illustrated in FIGS. 5A and 5B. These are not to scale and only illustrate placement, not relative dimensions. The micromechanical element 20' consists of an Au Cr Al/SiO$_2$ sandwich suspended over a hole 21' etched in the n epitaxial layer 11' on top of the p+ silicon layer 22 on substrate 10' using a differential etching technique. The FET structure is standard as is the diffusion crossunder 30 for X-Y line addressing. The depth of the etched hole for the micromechanics can be typically 5–10 μm. One typical fabrication procedure will be outlined. Many variations are possible.

Fabrication Procedure

Step 1:
Take a (100) oriented p-Si wafer 10' and dope surface p+ 22 about $5 \times 10^{19}$ cm$^{-3}$ as a barrier for etching.

Step 2:
Grow n-Si epitaxial layer 11' (5–10 μm).

Step 3:
Grow SiO$_2$ layer. Use photolithography over SiO$_2$ for opening diffusion holes. Diffuse p$^{30}$ regions 13', 14': (a) source/drain contacts; (b) X-Y line crossunders 30.

Step 4:
Strip oxide—Grow 3000–5000 Å thermal SiO$_2$ 12'.

Step 5:
Etch gate oxide regions—Grow 1000 Å thermal SiO$_2$ 31 to complete layer 12' in FIG. 5B.

Step 6:
Open contact holes 56' (source 13', drain 14', crossunders 30).

Step 7:
Metallize with Al/Au/Cr ($\approx$500 Å) to form the metal surface 18' on leaf 20', gate leads 17', source leads 15', and drain leads 16'.

Step 8:
Define reflector and wiring positions photolithography. Etch excess Al/Au/Cr.

Step 9:
Use photolithography to define square hole 35 around micromechanical valve region 20' region A in FIGS. 5A and 5B). Etch SiO$_2$ from hole 35. Etch underlying silicon in hole 21' using differential etchant, e.g., ethylenediamine and pyrocatechol. Note: the etchant must completely strip Si under micromechanical reflector area. The differential etchant will leave square sides for (110) oriented edges. The support plateau 36 remains to support micromechanical leaf 20'.

The completed light valve array should be packaged in an inert atmosphere (N$_2$, Ar, etc.) with a glass window. Image projection can be accomplished using a Schlieren optical system.

Electrical signals are introduced into the device via an X-Y matrix address scheme 25, 27 FIG. 4. The electrical information is stored in an MOSFET type memory element 24' associated with each cell 20'. The stored voltage is also present on the Al/Au/Cr electrode 16', 18' of each reflector element. The blanket p$^{30}$ diffusion 22 under the whole device structure is held at ground potential. The resulting electrostatic attraction between the microchemical reflector element 20' and the ground plane 22 causes the element 20' to deflect. Light incident on reflector element 20' will then be reflected in a direction governed by the voltage stored in the memory cell. Imaging the whole structure on a screen will produce a fully addressable N×N matrix of light dots, which can be utilized as a display.

If the memory element is designed with saturation type states (on/off), a high contrast display type system will be realized. If the element is used in a linear regime (the stored voltage is continuously variable) as in a capacitive (dynamic) storage, gray tones can be added (reflection is proportional to stored voltage).

This sytem can also be readily adapted to incorporate color projection systems.

Industrial Applicability

This invention circumvents some of the objections to the MALV (Mirror Array Light Valve) display systems. Potential advantages of the present invention are: (1) each deflectable element can be made to be a single PEL (Picture Element), thereby increasing the effective resolution; (2) an electron beam addressing scheme is unnecessary; (3) deflection voltages are a factor of 3 lower; and (4) the display chip is also the memory chip and the information in each PEL is electronically accessible, i.e., "selective" erasure and rewriting is possible.

Having thus described my invention, what I claim as new, and desire to secure by Letters Patent is:

1. A display device suitable for X-Y matrix addressing comprising:
a (100) oriented p-Si wafer;
a first layer of silicon containing regions of heavily boron doped (p$^{30}$) type silicon on the order of $5 \times 10^{19}$ cm$^{-3}$ as an etchant barrier;
a second layer of silicon having a thickness of 5–10 μm taken from the group consisting of p-type and n-type positioned on top of said first layer;
a layer of SiO$_2$ 3000–5000 Å thick above said second layer of silicon;
an MOS device formed in said second layer;
a plurality of hinged, electrostatically deflectable, metal coated oxide display members in spaced relation with said boron doped regions in said first layer and connected with a portion of said second layer, whereby said heavily boron doped region serves as a conductive region below each of said display members for provision of electrostatic control signals to said display member;
metallization forming the metal surface on said display members and forming an electrical x-y control matrix array deposited upon said layer of SiO$_2$ comprising Al/Au/Cr about 500 Å thick; and
each of said display members comprising a leaf element hinged to said second layer at one small portion of the edge thereof, said leaf element being located above a hollow space in said display device.

2. A display device comprising addressing circuitry, and semiconductor control logic deposited on an integrated structure formed by thin film technology on a single silicon wafer, said display device comprising an array of thin film micromechanical electrostatic form of light reflective display elements formed by depositing a thin film of an underlayer of an etchant resistant conductive film forming an electrode and subsequently depositing other thin films upon a semiconductor wafer and selectively etching to form metal-amorphous oxide micromechanical leaves, means for deflecting said leaves by applying potential thereto to provide electrostatic deflection and storage by operation of semiconductor logic devices formed upon said wafer in juxtaposition with said display elements, with matrix addressing means for activating said logic devices selectively and individually.

3. A display device in accordance with claim 2 wherein each of said micromechanical elements includes a hollow space below it with a conductive region in said wafer therebelow for providing one electrode with said element forming another electrode for providing electrostatic forces therebetween.

4. A display device in accordance with claim 2 wherein said logic devices are formed with electrical connections directly to a said juxtaposed micromechanical element, with a picture element of said display including at least one of said micromechanical elements and with a logic device provided for each of said picture elements of said display device located in juxtaposition with each micromechanical element for said picture element.

5. A display device in accordance with claim 1 wherein each of said leaf elements comprises a substantially square structure hinged at one corner.

6. A display device in accordance with claim 2 wherein each of said display elements comprises a substantially square leaf element hinged at one corner thereof to said wafer above a hollow space in said wafer.

7. A display device in accordance with claim 3 wherein each of said micromechanical elements comprises a substantially square leaf element hinged at one corner thereof to said wafer above said hollow space.

8. A display device comprising addressing circuitry, and semiconductor control logic deposited on an integrated structure formed by thin film technology on a single silicon wafer;

said display device comprising an array of thin film micromechanical electrostatic form of light reflective display elements formed by depositing thin films upon a semiconductor wafer and selectively etching to form metal coated amorphous oxide micromechanical leaves;

means for deflecting said leaves by applying potential thereto to provide electrostatic deflection and storage by operation of semiconductor logic devices formed upon said wafer in juxtaposition with said display elements with addressing means for activating said logic devices selectively;

each of said micromechanical elements located above a hollow space in said wafer with a conductive region in said wafer below said hollow space for providing one electrode with said element forming another electrode for providing electrostatic forces therebetween;

said logic devices being formed with electrical connections directly to a said juxtaposed micromechanical element with a picture element of said display including at least one of said micromechanical elements and with a logic device provided for each of said picture elements of said display device located in juxtaposition with each micromechanical element for said picture element;

said wafer being coated with a first layer of silicon containing regions of heavily boron doped ($p^{30}$) type silicon on the order of $5 \times 10^{19}$ cm$^{-3}$ as a barrier for etching and forming said conductive regions below said micromechanical elements;

a second layer of silicon having a thickness of 5-10 $\mu$m taken from the group consisting of p-type and n-type positioned on top of said first layer a layer of SiO$_2$ 3000-5000 Å thick above said second layer of silicon;

a plurality of MOS devices formed in said second layer; and each of said display elements comprising a substantially square leaf element hinged at one corner thereof to said wafer above said hollow space in said wafer with said metal coated oxide display elements in spaced relation with each of said boron doped regions in said first layer and connected with a portion of said second layer.

* * * * *